US011733397B2

(12) United States Patent
Reimer et al.

(10) Patent No.: US 11,733,397 B2
(45) Date of Patent: Aug. 22, 2023

(54) SYSTEM AND METHOD FOR COMPUTING POSITIONING PROTECTION LEVELS

(71) Applicant: SWIFT NAVIGATION, INC., San Francisco, CA (US)

(72) Inventors: Christian Reimer, San Francisco, CA (US); Philippe Brocard, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 17/873,068

(22) Filed: Jul. 25, 2022

(65) Prior Publication Data

US 2023/0026395 A1    Jan. 26, 2023

Related U.S. Application Data

(60) Provisional application No. 63/225,450, filed on Jul. 24, 2021.

(51) Int. Cl.
*G01S 19/47* (2010.01)
*G01S 19/40* (2010.01)
*G01S 19/44* (2010.01)
*G01S 19/20* (2010.01)

(52) U.S. Cl.
CPC ............. *G01S 19/47* (2013.01); *G01S 19/20* (2013.01); *G01S 19/40* (2013.01); *G01S 19/44* (2013.01)

(58) Field of Classification Search
CPC ........... G01S 19/47; G01S 19/40; G01S 19/44
USPC .................................................. 342/357.38
See application file for complete search history.

(56) References Cited

U.S. PATENT DOCUMENTS

| 5,610,614 | A  | 3/1997  | Talbot et al.    |
|-----------|----|---------|------------------|
| 6,427,122 | B1 | 7/2002  | Lin              |
| 6,453,237 | B1 | 9/2002  | Fuchs et al.     |
| 6,647,340 | B1 | 11/2003 | Pemble et al.    |
| 6,691,066 | B1 | 2/2004  | Brodie           |
| 6,856,905 | B2 | 2/2005  | Pasturel et al.  |
| 6,864,836 | B1 | 3/2005  | Hatch et al.     |

(Continued)

FOREIGN PATENT DOCUMENTS

| CA | 3079279 A1  * | 10/2020 | ............. G01S 19/20 |
| CN | 101166995 A * | 4/2008  | ............. G01S 19/04 |

(Continued)

OTHER PUBLICATIONS

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

(Continued)

*Primary Examiner* — Harry K Liu
(74) *Attorney, Agent, or Firm* — Jeffrey Schox; Randy Mehlenbacher

(57) ABSTRACT

A method or system can include or be configured to receive a set of satellite observations, receiving sensor data, determining a position estimate and associated positioning error for a rover based on the set of satellite observations and the sensor data, determine a protection level associated with the position estimate based on a set of potential faults, and optionally provide an alert when the positioning error exceeds the protection level.

23 Claims, 6 Drawing Sheets

(56) References Cited

U.S. PATENT DOCUMENTS

| | | |
|---|---|---|
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,409,289 B2 | 8/2008 | Coatantiec et al. |
| 7,692,578 B2 | 4/2010 | Vollath et al. |
| 7,696,922 B2 | 4/2010 | Nicholson et al. |
| 8,094,065 B2 | 1/2012 | Henkel |
| 8,193,976 B2 | 6/2012 | Shen et al. |
| 8,255,155 B1 | 8/2012 | Crane et al. |
| 8,447,517 B2 | 5/2013 | Roh |
| 8,542,146 B2 | 9/2013 | Vollath |
| 8,610,624 B2 | 12/2013 | Savoy |
| 8,756,001 B2 | 6/2014 | Georgy et al. |
| 8,760,343 B2 | 6/2014 | Milyutin et al. |
| 8,825,456 B2 | 9/2014 | Vasudevan et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,182,497 B2 | 11/2015 | Geier et al. |
| 9,405,012 B2 | 8/2016 | Doucet et al. |
| 9,405,016 B2 | 8/2016 | Yim |
| 9,557,422 B1 | 1/2017 | Miller et al. |
| 9,568,321 B2 | 2/2017 | Bharadwaj et al. |
| 9,602,974 B2 | 3/2017 | Rudow et al. |
| 9,612,341 B2 | 4/2017 | Large et al. |
| 9,709,683 B2 | 7/2017 | Leandro et al. |
| 9,784,844 B2 | 10/2017 | Kana et al. |
| 9,927,530 B2 * | 3/2018 | Boyarski ............. G01C 21/185 |
| 10,018,729 B2 | 7/2018 | Dunik et al. |
| 10,101,464 B2 | 10/2018 | Appleford et al. |
| 10,191,157 B2 | 1/2019 | Dai et al. |
| 10,260,888 B2 | 4/2019 | Takahashi |
| 10,274,606 B1 | 4/2019 | Phan et al. |
| 10,459,593 B2 | 10/2019 | Tiwari et al. |
| 10,578,747 B2 | 3/2020 | Grgich et al. |
| 10,677,933 B1 | 6/2020 | Gavrilets et al. |
| 10,809,388 B1 | 10/2020 | Carcanague et al. |
| 11,156,718 B2 | 10/2021 | Takeda |
| 11,187,813 B2 | 11/2021 | Brandl et al. |
| 11,422,271 B2 | 8/2022 | Talbot et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | McAree et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0154210 A1 | 6/2012 | Landau et al. |
| 2012/0176271 A1 | 7/2012 | Dai et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2014/0015712 A1 | 1/2014 | Leandro et al. |
| 2014/0062765 A1 | 3/2014 | Brenner |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2015/0019464 A1 | 1/2015 | Nguyen-Tuong et al. |
| 2015/0260848 A1 | 9/2015 | Mundt et al. |
| 2015/0293230 A1 | 10/2015 | Weed et al. |
| 2015/0293233 A1 | 10/2015 | De Jong |
| 2016/0011318 A1 | 1/2016 | Cohen |
| 2016/0097859 A1 | 4/2016 | Hansen et al. |
| 2016/0195617 A1 | 7/2016 | Phatak et al. |
| 2017/0131407 A1 | 5/2017 | Dunik et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0172838 A1 | 6/2018 | Junker et al. |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0302274 A1 | 10/2019 | Berntorp et al. |
| 2019/0339396 A1 | 11/2019 | Turunen |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2020/0257002 A1 | 8/2020 | Henkel |
| 2020/0348422 A1 | 11/2020 | Carcanague et al. |
| 2021/0033735 A1 | 2/2021 | Kleeman |
| 2021/0116579 A1 | 4/2021 | Rezaei |
| 2022/0058322 A1 | 2/2022 | Brandl et al. |

FOREIGN PATENT DOCUMENTS

| | | | |
|---|---|---|---|
| CN | 103760573 A | 4/2014 | |
| CN | 104732085 A | 6/2015 | |
| CN | 106970404 A * | 7/2017 | ............. G01S 19/40 |
| CN | 105629263 B | 4/2019 | |
| CN | 107422354 B | 6/2019 | |
| CN | 109714421 B | 8/2021 | |
| CN | 114174850 A | 3/2022 | |
| EP | 0244091 A2 | 11/1987 | |
| EP | 1729145 A1 | 12/2006 | |
| EP | 2128841 A1 | 12/2009 | |
| EP | 2602752 A1 | 6/2013 | |
| EP | 1839070 B2 | 4/2014 | |
| EP | 2966477 A1 | 1/2016 | |
| EP | 3627188 A1 | 3/2020 | |
| EP | 3566021 B1 | 3/2021 | |
| KR | 101181990 B1 | 9/2012 | |
| WO | 02061449 A1 | 8/2002 | |
| WO | 2017046914 A1 | 3/2017 | |
| WO | 2017070732 A1 | 5/2017 | |
| WO | 2018188845 A1 | 10/2018 | |

OTHER PUBLICATIONS

Teunissen, Peter J.G., et al., "Integer Aperture Estimation a Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587.

Thombre, Sarang , et al., "GNSS Threat Monitoring and Reporting: Past, Present, and a Proposed Future", the Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon , "An Analysis of Multi-Frequency Carrier Phase Linear Combinations for GNSS", Department of Geodesy and

(56) References Cited

OTHER PUBLICATIONS

Geomatics Engineering, University of New Brunswick, Technical Report No. 263, Feb. 2009.
Urquhart, Landon, et al., "Innovation: Integrity for safe navigation", https://www.gpsworld.com/innovation-integrity-for-safe-navigation-provided-by-gnss-service/, GPS World, Feb. 12, 2020.
Van Diggelen, Frank, et al., "Google to improve urban GPS accuracy for apps", Dec. 9, 2020, Android Developers Blog.
Van Graas, Frank, et al., "Precise Velocity Estimation Using a Stand-Alone GPS Receiver", Abstract only, Journal of the Institute of Navigation, vol. 51, No. 4, Winter 2004-2005, pp. 283-292, https://www.ion.org/publications/abstract.cfm?articleID=102384.
Verhagen, S., "The GNSS integer ambiguities: Estimation and validation", Aerospace Engineering, Jan. 31, 2005.
Waserman, Eyal, et al., "A Mixed Integer Least-Squares Formulation of the GNSS Snapshot Positioning Problem", https://github.com/eyalw711/snapshot-positioning, Jun. 2, 2021.
Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.
Zhu, Ni, et al., "GNSS Position Integrity in Urban Environments: a Review of Literature", IEEE Transactions on Intelligent Transportation Systems, 2018, 17p., 10.1109/TITS.2017.2766768.hal-01709519.
Watanabe, Yoko, et al., "Fault-tolerant final approach navigation for a fixed-wing UAV by using long-range stereo camera system", 2020 International Conference on Unmanned Aircraft Systems (ICUAS) Athens, Greece, Sep. 1-4, 2020.
"An Introduction to GNSS, Chapter 4, GNSS Error Sources", https://novatel.com/an-introduction-to-gnss/chapter-4-gnsserror-sources, published 2015.
"Geo++ SSR for Network-RTK, PPP and PPP-RTK", https://geopp.de/wp-content/uploads/2020/09/SSR_Flyer_v3.pdf, Sep. 2015.
"IGS State Space Representation (SSR) Format Version 1.00", International GNSS Service (IGS), Oct. 5, 2020.
"Integrity-Navipedia", https://gssc.esa.int/navipedia/index.php/Integrity, published 2011.
"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.
"RAIM", GMV, 2011, RAIM.
"Safe Position Augmentation for Real-Time Navigation (SPARTN) Interface Control Document Version 1.8.0", Jan. 2020, Sapcorda Services GmbH.
Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.
Blanch, Juan, et al., "RAIM with Optimal Integrity and Continuity Allocations Under Multiple Failures", IEEE Transactions on Aerospace and Electronic Systems, vol. 46, No. 3, Jul. 2010.
Brack, A., "Optimal Estimation of a Subset of Integers With Application to GNSS", Artificial Satellites, vol. 51, No. 4—2016 DOI: 10.1515/arsa-2016-0011.
Brocard, Philippe, "Integrity monitoring for mobile users in urban environment", https://tel.archives-ouvertes.fr/tel-01379632/document, submitted Oct. 11, 2016.
Bruno, Jon, et al., "A realistic simulation framework to evaluate ionospheric tomography", Advances in Space Research 65 (2020) 891-901.
Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.
Chiu, David S., et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.
Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.
Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.
Favey, Etienne, et al., "Dead reckoning fills-in GPS navigation gap", EE Times, Automotive Designline, Aug. 18, 2011.
Feng, Shaun, et al., "Carrier phase-based integrity monitoring for high-accuracy positioning", GPS Solution, Apr. 2009.
Gratton, Livio, et al., "Carrier Phase Relative RAIM Algorithms and Protection Level Derivation", Journal of Navigation (2010), 63, 215-231, doi: 10.1017/S0373463309990403.
Gunning, Kazuma, et al., "Design and evaluation of integrity algorithms for PPP in kinematic applications", Proceedings of the 31st International Technical Meeting of the Satellite Division of the Institute of Navigation (ION GNSS+ 2018) Sep. 24-28, 2018, Hyatt Regency Miami, Miami, Florida.
Henkel, Patrick, et al., "Joint L-/C-Band Code and Carrier Phase Linear Combinations for Galileo", International Journal of Navigation and Observation, vol. 2008, Article ID 651437, 8 pages.
Hirokawa, Dr. Rui, "Recent Activity of International Standardization for High-Accuracy GNSS Correction Service", Mitsubishi Electric, Jun. 27, 2019.
Huang, Panpan, "Airborne GNSS PPP Based Pseudolite System", School of Civil and Environmental Engineering Faculty of Engineering UNSW. Jun. 2019.
Karaim, Malek, et al., "GNSS Error Sources", https://www.intechopen.com/books/multifunctional-operation-and-application-of-gps/gnss-error-sources, published Apr. 6, 2018.
Khanafseh, Samer, et al., "GNSS Multipath Error Modeling for Automotive Applications", Abstract only, Proceedings of the 31st International Technical Meeting of the Satellite Division of the Institute of Navigation (ION GNSS+ 2018), Miami, Florida, Sep. 2018, pp. 1573-1589, https://www.ion.org/publications/abstract.cfm?articleID=16107.
Kilic, Cagri, et al., "ZUPT Aided GNSS Factor Graph with Inertial Navigation Integration for Wheeled Robots", Proceedings of the 34th International Technical Meeting of the Satellite Division of the Institute of Navigation (ION GNSS+ 2021) Sep. 20-24, 2021.
Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.
Ko, Jonathan, et al., "GP-UKF: Unscented kalman filters with Gaussian process prediction and observation models", Conference Paper, Dec. 2007, 10.1109/IROS.2007.4399284.
Kuusniemi, Heidi, et al., "GNSS Signal Reliability Testing in Urban and Indoor Environments", Proceedings of NTM 2004 Conference (Session A2), San Diego, CA, Jan. 26-28, 2004, the Institute of Navigation.
Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.
Lei, Yu, et al., "Prediction of Navigation Satellite Clock Bias by Gaussian Process Regression", Lecture Notes in Electrical Engineering 342:411-423, Jan. 2015.
Li, T., et al., "Some remarks on GNSS integer ambiguity validation methods", Survey Review, Dec. 5, 2012, vol. 44, No. 326.
Lin, Ming, et al., "Robust Gaussian Process Regression for Real-Time High Precision GPS Signal Enhancement", www.gps.gov/systems/gps/performance/accuracy, Jun. 5, 2019.
Liu, Haiying, et al., "A closed-loop EKF and multi-failure diagnosis approach for cooperative GNSS positioning", Engineering, GPS Solutions, Published 2015.
Madrid, Navarro, et al., "New Approach for Integrity Bounds Computation Applied to Advanced Precise Positioning Applica-

(56) References Cited

OTHER PUBLICATIONS tions", Proceedings of the 28th International Technical Meeting of the Satellite Division of the Institute of Navigation (ION GNSS+ 2015) Sep. 14-18, 2015, Tampa Convention Center, Tampa, Florida.

Meng, Xiaoli, et al., "A Robust Vehicle Localization Approach Based on GNSS/IMU/DMI/LiDAR Sensor Fusion for Autonomous Vehicles", Sensors, 2017, 17, 2140.

Odijk, Dennis, et al., "On the estimability of parameters in undifferenced, uncombined GNSS network and PPP-RTK user models by means of S-system theory", Journal of Geodesy, Nov. 2015.

Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.

Pervan, Boris, et al., "Shaping Aviation Integrity Two RAIMs for Safety", GPS World the Business and Technology of Global Navigation and Positioning, Apr. 1, 2008.

Phelts, R. Eric, et al., "Innovation: Improving ARAIM, an approach using precise point positioning", GPS World, Jun. 13, 2020, https://www.gpsworld.com/innovation-improving-araim/.

Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Rasmussen, C.E., et al., "Gaussian Processes for Machine Learning", MIT Press, 2006, ISBN 026218253X. c 2006 Massachusetts Institute of Technology, (Year: 2006).

Rodriguez-Solano, Carlos, et al., "Protection Level of the Trimble RTX Positioning Engine for Autonomous Applications", Proceedings of the 34th International Technical Meeting of the Satellite Division of the Institute of Navigation (ION GNSS+ 2021), Sep. 20-24, 2021.

Satirapod, Chalermchon, "Improving the GPS Data Processing Algorithm for Precise Static Relative Positioning", School of Surveying and Spatial Information Systems the University of New South Wales. Jan. 2002.

Schmitz, Martin, "RTCM State Space Representation Messages, Status and Plans", PPP-RTK & Open Standards Symposium, Mar. 12-13, 2012, Frankfurt, Germany.

Shapiro, Larry S., et al., "Rejecting Outliers and Estimating Errors in an Orthogonal-Regression Framework", Phil. Trans. R. Soc. Load. A (1995)350, 407-439. (Year:1995).

Skog, Isaac, et al., "A Low-Cost GPS Aided Inertial Navigation System for Vehicle Applications", 2005 13th European Signal Processing Conference, Sep. 4-8, 2005.

Snelson, Edward, et al., "Sparse Gaussian Process using Pseudo-inputs", NIPS'05: Proceedings of the 18th International Conference on Neural Information Processing Systems, Dec. 2005, pp. 1257-1264.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji, et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

* cited by examiner

| Element impacted | Fault | $P_{occ}$ | $P_{MD}$ |
|---|---|---|---|
| GNSS satellite | Satellite hardware faults | $10^{-6}$/hr | $10^{-6}$ |
| GNSS satellite | Satellite maneuvers | $10^{-5}$/hr | $10^{-2}$ |
| GNSS satellite | Antenna pattern change | $10^{-3}$/hr | $10^{-3}$ |
| Environment | Multipath | 10/hr (urban environment) 1/hr (open sky environment) | $10^{-4}$ |
| Environment | Cycle slips | 1/hr (urban environment) $10^{-2}$/hr (open sky environment) | $10^{-4}$ |
| Sensor | Clipping problems | $10^{-4}$/hr | $10^{-4}$ |
| Sensor | Sensor bias abnormal instability | $10^{-3}$/hr | $10^{-5}$ |
| GNSS receiver | Receiver hardware faults | $10^{-2}$/hr | $10^{-2}$ |

FIGURE 7

SYSTEM AND METHOD FOR COMPUTING POSITIONING PROTECTION LEVELS

CROSS-REFERENCE TO RELATED APPLICATIONS

This application claims the benefit of U.S. Provisional Application No. 63/225,450, filed 24 Jul. 2021, which is incorporated in its entirety by this reference.

TECHNICAL FIELD

This invention relates generally to the satellite positioning field, and more specifically to a new and useful system and method in the satellite positioning field.

BRIEF DESCRIPTION OF THE FIGURES

FIG. 7 is a schematic representation of an illustrative example of a set of faults and associated fault information.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
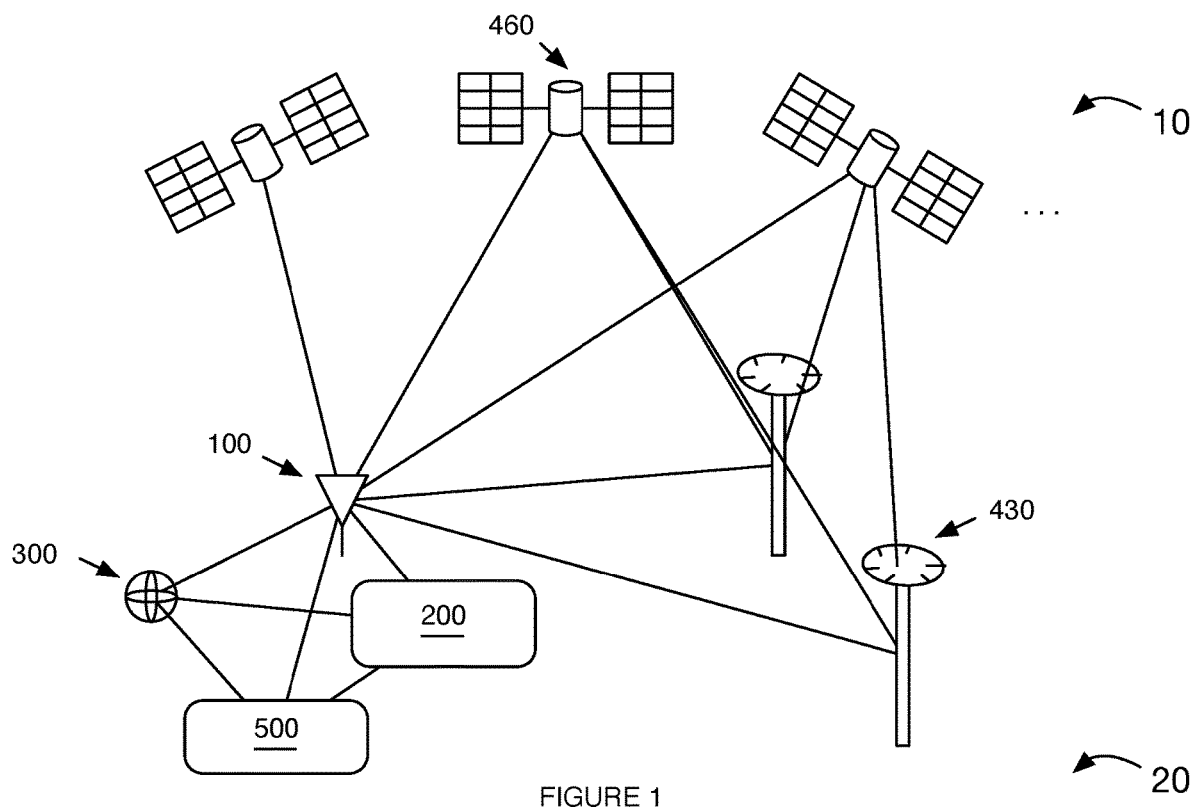
FIG. 1 is a schematic representation of the system.

As shown in FIG. 1, the system can include a GNSS receiver 100, a computing system 200, and a sensor 300. The system can optionally include (e.g., be connected to) one or more data sources 400, an external system 500, and/or any suitable components.

Figure 2:
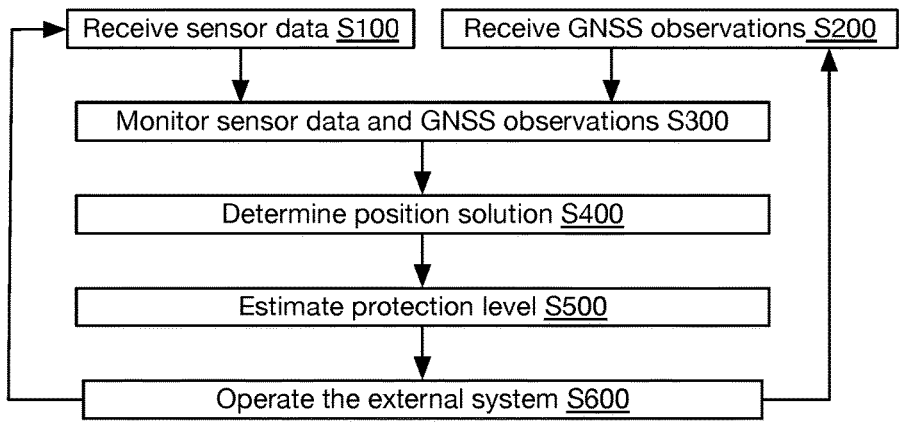
FIG. 2 is a schematic representation of the method.

As shown in FIG. 2, the method can include: receiving sensor data S100, receiving GNSS observations S200, determining a position solution S400, and determining a protection level S500. The method can optionally include monitoring the sensor data and/or GNSS observations S300, operating an external system S600, and/or any suitable steps.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components thereof) can be coupled to any suitable external system 500 such as a vehicle (e.g., UAV, UAS, car, truck, etc.), robot, railcar, user device (e.g., cell phone), and/or any suitable system, and can provide positioning data, integrity data (e.g., protection level data), and/or other data to said external system.

2. Benefits.

Variations of the technology can confer several benefits and/or advantages.

First, variants of the technology can enable a protection level (e.g., associated with a GNSS receiver position) to be calculated before an integer-fixed solution is available (e.g., for an RTK positioning solution). For example, using sensor measurements (e.g., in addition to satellite observations) can enable the determination of the GNSS receiver position and/or protection level (e.g., a protection level that can enable autonomous or semi-autonomous operation of an external system) before an integer carrier phase ambiguity can be resolved.

Second, variants of the technology can enable a more accurate (e.g., conservative, tighter, more representative, closer to the true value, etc., in one or more coordinates) protection level to be achieved. More accurate protection levels can be beneficial for ensuring or providing more accurate knowledge of the probable receiver position and/or a risk that the GNSS receiver (and/or external system) is not where it is expected or supposed to be. For instance, a determined protection level (e.g., the protection level after a final iteration, the protection level after the first iteration, etc.) can be greater than a true protection level by at most about 30% (e.g., 1% greater, 2% greater, 5% greater, 10% greater, 15% greater, 20% greater, 25% greater, values or ranges therebetween, etc.). Moreover, the determined protection level can be determined in real or near-real time (e.g., updated for each sensor measurement update, for each satellite observation received, etc.) while achieving these bounds relative to the actual protection level (which can require significantly longer to converge on the value of). In a specific example, the more accurate protection levels can be achieved by inflating the covariances (which can enable the covariances to bound nominal errors) in the receiver position and/or by accurately accounting for potential fault modes (e.g., based on the fault impact model, based on the fault probability, based on an allocated integrity risk, etc.). However, the determined protection level can be less than the actual protection level, and/or can be determined with any suitable timing.

Figure 5:
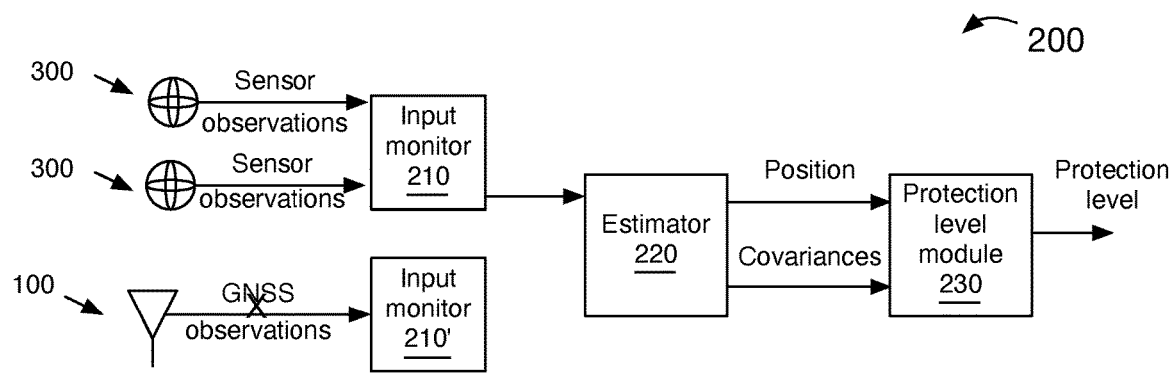
FIG. 5 is a schematic representation of an example of computing a protection level during a satellite outage.

Third, variants of the technology can enable a modular determination of a protection level. For example, as conditions change (e.g., satellites come in view or leave view of a GNSS receiver, as shown for example in FIG. 5, etc.), examples of the technology can continue to determine the protection level without using new processes (e.g., by updating a fault model that is used, by updating a list of faults considered, etc.).

However, variants of the technology can confer any other suitable benefits and/or advantages.

3. System.

As shown in FIG. 1, the system can include a GNSS receiver 100, a computing system 200, and a sensor 300. The system can optionally include one or more data sources 400, an external system 500, and/or any suitable components. The system preferably functions to determine a positioning solution (e.g., a position, velocity, acceleration, heading, attitude, elevation, etc.) of a GNSS receiver and/or external system, determine a protection level associated with the position, and/or can otherwise function.

The system preferably uses a set of data collected by and/or received from one or more data sources 400. Data sources can include: GNSS receivers 100, sensors 300 (e.g., located onboard the GNSS receiver, the external system, a reference station, etc.), databases, reference stations 430, satellites 460, and/or any other suitable data source. Examples of data that can be used include: satellite observations, reference station observations, sensor data, and/or any other suitable data.

The GNSS receiver 100 preferably functions to receive and track a set of satellite signals from one or more satellites. In variants, the GNSS receiver (e.g., a computing system thereof, a positioning engine operating thereon, etc.) can determine the location (e.g., by using pseudoranges, by using carrier phase) of the GNSS receiver (e.g., the GNSS receiver antenna, the external system, etc.) based on the satellite signals. The GNSS receiver is preferably in communication with the computing system. However, the GNSS receiver can be integrated with the computing system (e.g., on the same chip), and/or the GNSS receiver and computing system can be arranged in any suitable manner. The GNSS receiver can be a stand-alone device (e.g., including an antenna), integrated into the external system (e.g., be a component of an automobile, aero vehicle, nautical vehicle, etc.), can be a user device (e.g., smart phone, laptop, cell phone, smart watch, etc.), and/or can be configured in any suitable manner.

The set of satellite observations can include orbital data, timestamp, range rate data, carrier phase data, pseudorange data, doppler data, and/or any suitable data. The set of satellite observations can be associated with metadata (e.g., ephemeris), and/or any suitable data. The set of satellite observations preferably includes satellite observations corresponding to satellites from more than one satellite constellation (e.g., Global Positioning System (GPS), GLObal Navigation Satellite System (GLONASS), BeiDou positioning System (BDS), Galileo, Navigation with Indian Constellation (NavIC), Quasi-Zenith Satellite System (QZSS), GPS Aided Geo Augmented Navigation (GAGAN), etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data. Each satellite observation from the set of satellite observations preferably corresponds to a common time window (e.g., epoch). However, each satellite observation can be associated with a timestamp (e.g., time of transmission, time of receipt, time of processing, etc.), and/or the satellite observations can have any suitable timing.

A GNSS receiver can be configured to receive satellite observations associated with one or more satellite constellations, one or more carrier frequencies (e.g., the L1, L2, L5, E1, E5a, E5b, Eab, E6, G1, G3, B1, B2, B3, LEX, etc. frequencies), and/or any suitable data. In variants of the system including more than one receiver (e.g., more than one antenna), each receiver can be configured to receive the same and/or different satellite signals (e.g., associated the same or different satellite constellation(s), the same or different carrier frequency(s), etc.).

The GNSS receiver can be in communication with a correction service (e.g., a networked correction service, PPP correction service, PPP-RTK correction service, SSR correction service, RTK correction service, etc.), which can provide corrections (e.g., for spatially invariant corrections such as clock, orbit, hardware bias, etc.; for spatially variant corrections such as ionosphere delay, troposphere delay, etc.; etc. such as those as disclosed in U.S. patent application Ser. No. 17/347,874 filed 15 Jun. 2021 entitled "SYSTEMS AND METHODS FOR DISTRIBUTED DENSE NETWORK PROCESSING OF SATELLITE POSITIONING DATA" and/or U.S. patent application Ser. No. 16/983,706 filed 3 Aug. 2020 entitled "SYSTEM AND METHOD FOR GAUSSIAN PROCESS ENHANCED GNSS CORRECTIONS GENERATION," each of which is incorporated in its entirety by this reference) for one or more of the satellite observations. In a specific example, the corrections can be provided and/or used as disclosed in U.S. patent application Ser. No. 17/379,271 filed 19 Jul. 2021 entitled "SYSTEM AND METHOD FOR PROVIDING GNSS CORRECTIONS" and/or in U.S. patent application Ser. No. 17/374,523 filed 13 Jul. 2021 entitled "SYSTEM AND METHOD FOR DETERMINING GNSS POSITIONING CORRECTIONS," each of which is incorporated in its entirety by this reference. In some variations, the computing system can monitor the incoming corrections for predetermined events (e.g., faults), where faults in the corrections can impact the determined protection level.

The sensor(s) 300 preferably function to measure sensor data (e.g., auxiliary data) associated with the external system (and/or the GNSS receiver). The sensor data is preferably used to determine (e.g., independent of the satellite observations) the external system location, but can additionally or alternatively be used to assist (e.g., speed-up, correct, refine, etc.) the calculation (e.g., calculating the state vector, estimating the phase ambiguity) of position from the satellite observations and/or be otherwise used. The sensors are preferably in communication with the computing system.

The sensors can be: on-board the external system, on-board a separate external system, integrated into the GNSS receiver, separate from the GNSS receiver, and/or otherwise associated with the GNSS receiver.

The sensor data can include: inertial data (e.g., acceleration, angular velocity, angular acceleration, magnetic field, etc.), odometry, pose (e.g., position, orientation), mapping data (e.g., images, point clouds), temperature, pressure, ambient light, images (e.g., thermal images, optical images, etc.; landmarks, features, etc. associated with the images; etc.), video feeds, and/or any other suitable data. The sensors can include one or more of: inertial measurement unit (IMU), accelerometer, gyroscope, magnetometer, odometer (e.g., wheel speeds; wheel ticks; steering angles; visual odometers such as cameras; etc.), pressure sensors, distance measurement instrument, image sensor (e.g., camera, thermal camera, etc.), LIDAR, RADAR, SONAR, and/or any suitable sensor.

The system can include more than one GNSS receivers and/or sensors, which can function to provide redundancy, provide information in the event of an outage to one of the GNSS receivers or sensors, provide validation and/or cross checks between data sources (e.g., be used to monitor or detect the incoming data streams), and/or otherwise function. The relative pose (e.g., a lever arm) between each GNSS receiver (e.g., between each GNSS receiver antenna), each sensor, and/or each GNSS receiver/sensor pair is preferably known (e.g., to an accuracy of about 1 mm, 5 mm, 1 cm, 5 cm, 1 dm, etc.), but can be unknown (e.g., can vary such as because the components are not rigidly mounted relative to one another). The lever arm can be estimated (e.g., included as a state of a filter, estimated by a fusion engine, estimated by a GNSS filter, estimated by a DR filter, etc.), accounted for in a measurement covariance (e.g., within a measurement model that is processed as part of a filter), and/or can otherwise be account for. The lever arm can be beneficial for monitoring and/or detection of faults, for bounding a fault impact, for bounding a probability of a fault occurring, and/or can otherwise be beneficial.

When the system includes more than one sensor, each sensor can be the same or different. In a first illustrative example, the system can include a plurality of IMU sensors. In a second illustrative example, the system can include an IMU sensor (e.g., accelerometer, gyroscope, and/or magnetometer) and a wheel tick sensor. However, any suitable sensors can be used.

The computing system preferably functions to perform the method 20 (e.g., as described below), process the data (e.g., satellite observations, reference station observations, sensor data, etc.) received by the GNSS receiver(s) and/or the sensor(s). The computing system can: aggregate the data (e.g., combine the GNSS receiver satellite observations, reference station satellite observations, satellite corrections, and/or sensor data; reorganize the GNSS receiver satellite observations, reference station satellite observations, and/or sensor data such as based on the timestamp, time of transmission, time of receipt, etc.; etc.), filter the data (e.g., to calculate state vectors, ambiguities such as phase ambiguities, etc. associated with the data), calculate the GNSS receiver position (e.g., the GNSS phase center position), calculate the protection level, calculate the external system location, correct the data (e.g., correct the satellite observations for clock errors, hardware bias, atmospheric effects, etc.), and/or can process the data in any suitable manner. The computing system can be local (e.g., to the external system, to the GNSS receiver, to the sensor, etc.), remote (e.g., cloud computing, server, networked, etc.), and/or otherwise distributed.

The computing system is preferably communicably coupled to the GNSS receiver and/or the sensors, but can be communicably coupled to any suitable data sources. The computing system is preferably colocalized with (e.g., integrated into) the GNSS receiver (and/or external system), but the computing system can be remote from the GNSS receiver (and/or external system), and/or configured in any suitable manner.

Figure 3:
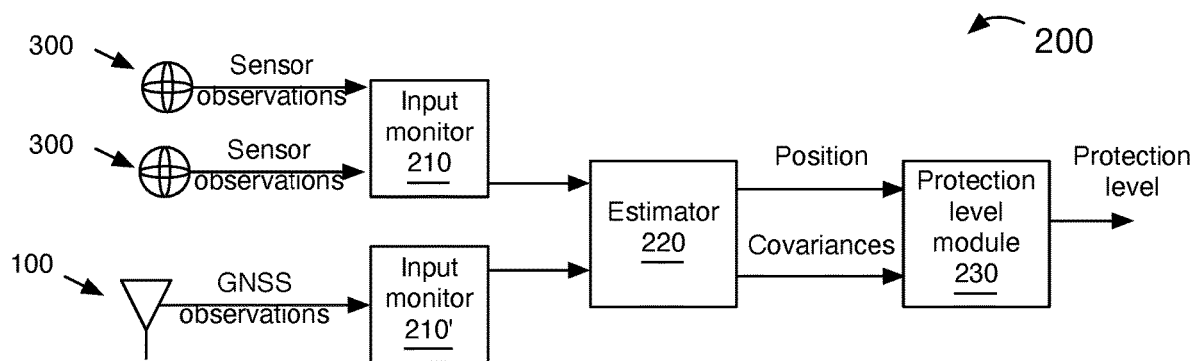
FIG. 3 is a schematic representation of an exemplary data flow through the system.
Figure 6:
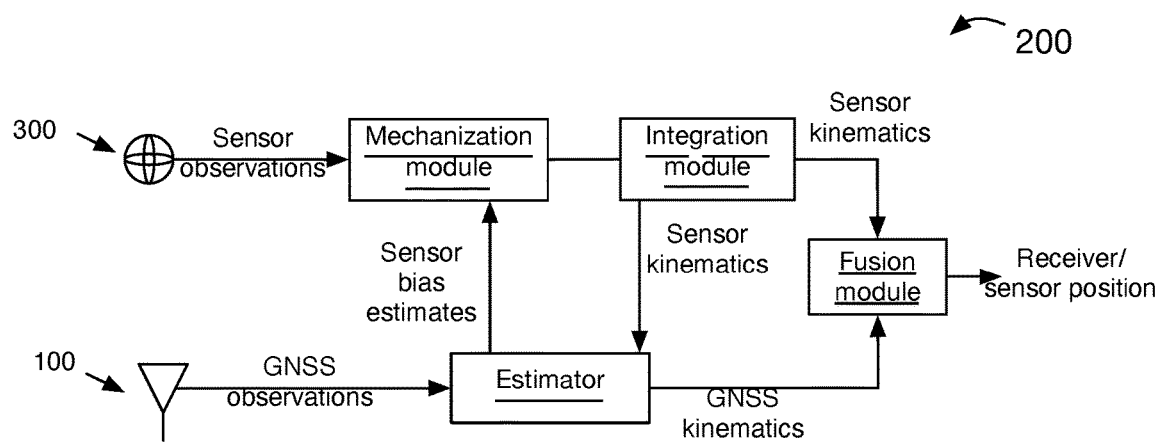
FIG. 6 is a schematic representation of an example of a loosely coupled dead reckoning and GNSS positioning solution.
Figure 10:
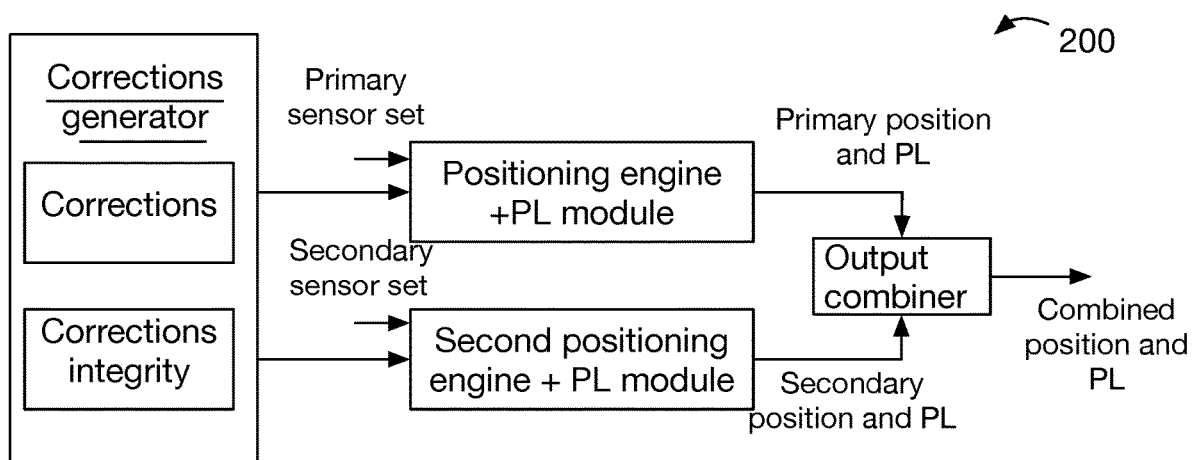
FIG. 10 is a schematic representation of an example of combining a plurality of positioning and/or protection level chains.

The computing system can include any suitable processors, microprocessors, graphics processing units, computer processing units, memory, and/or any suitable components. In some variants, the computing system can include one or more: error estimator 220 (e.g., filter, particle filter, Kalman filter, extended Kalman filter, unscented Kalman filter, estimator, etc. such as an IMU error estimator, a GNSS error estimator, sensor fusion module, etc. which can function to estimate IMU errors, GNSS errors, time synchronization to account for latencies between data sources, etc.), integrity module 230 (e.g., protection level calculator, protection level modeler, integrity modeler, alert limit modeler, etc.), monitor (e.g., GNSS monitor, sensor monitor, fault monitor, fault detector, event monitor, event detector, input monitor 210 210', etc.), error modeler (e.g., functional to define error terms, variances, etc. for consideration such as within the error estimator, to define an error model, etc., where error terms can include a simple bias such as a linear bias; higher order bias terms such as quadratic, cubic, quartic, quintic, etc.; other error terms such as scale factors, nonorthogonalities, misalignments, etc.; etc.), positioning engine, fusion engine (e.g., fusion module), sensor engine, a mechanization module (e.g., mechanization engine such as functional to discretize a physical model, etc.), digital signals processor (e.g., low pass filter, high pass filter, bandpass filter, notch filter, etc.), an integration module (e.g., integration engine; dynamic equations such as discretized dynamic equations, continuous dynamic equations, etc.; numerical integrator such as Runge-Kutta integrator, Euler integration, Bortz correction, midpoint rule, extrapolation, adaptive algorithms, Newton-Coates formula, Simpson method, conservative error estimation, quadrature rules, Monte Carlo techniques, sparse grid techniques, Bayesian quadrature techniques, Romberg's method, etc.; etc.), a buffer (e.g., temporary storage), an error compensator (e.g., machine learning algorithm, artificial intelligence, equations, relationships, conditions, look-up table, etc.), an integrity monitor (e.g., machine learning algorithm, artificial intelligence, equations, relationships, conditions, look-up table, etc. such as functional to determine or identify a time integrity flags based on outlier detection, artificial dropouts, etc.), a classifier (e.g., machine learning algorithm, artificial intelligence, equations, relationships, conditions, look-up table, etc.), and/or any suitable components. However, any component (e.g., module, engine, etc.) of the computing system can include and/or perform any suitable algorithm or method. Exemplary connections between computing system modules are shown for instance in FIGS. 3 and 6. However, the computing system can include any suitable modules connected in any suitable manner. In some variants, a plurality of separate chains can be used (e.g., where each chain can use the same or different inputs) and can be combined (as shown for example in FIG. 10). The positioning solution (e.g., position, velocity, positioning error, protection level, etc.) can be combined by averaging (e.g., weighted averaging), voting, selected using machine learning, and/or can otherwise be combined.

4. Method.

The method 20 preferably functions to determine kinematic parameters (e.g., positioning solution, position, velocity, acceleration, jerk, jounce, snap, attitude, heading, etc.) of a moving body (e.g., mobile receiver, external system, sensor, GNSS receiver, etc.) based on sensor data and/or GNSS observations. The kinematic parameters can include: position, derivatives of the position with respect to time (e.g., speed, velocity, acceleration, jerk, jounce, etc.), heading, attitude, errors associated therewith, covariances therebetween, and/or any suitable parameters. The kinematic parameters can be relative (e.g., to a reference point, to a reference location, previously determined kinematic parameters, etc.) or absolute (e.g., absolute coordinates). The kinematic parameters can be determined, for example, in north east down (NED) frame, east north up (ENU) frame, earth centered earth fixed (ECEF) frame, body frame, a geocode, coordinates (e.g., map coordinates, spherical coordinates, etc.), a WGS84 coordinate frame (e.g., a latitude, longitude, and altitude in WGS84 coordinates), a distance from a reference point (e.g., x meters north, y meters east, z meters below a reference point), and/or in any coordinate frame(s).

Figure 4:
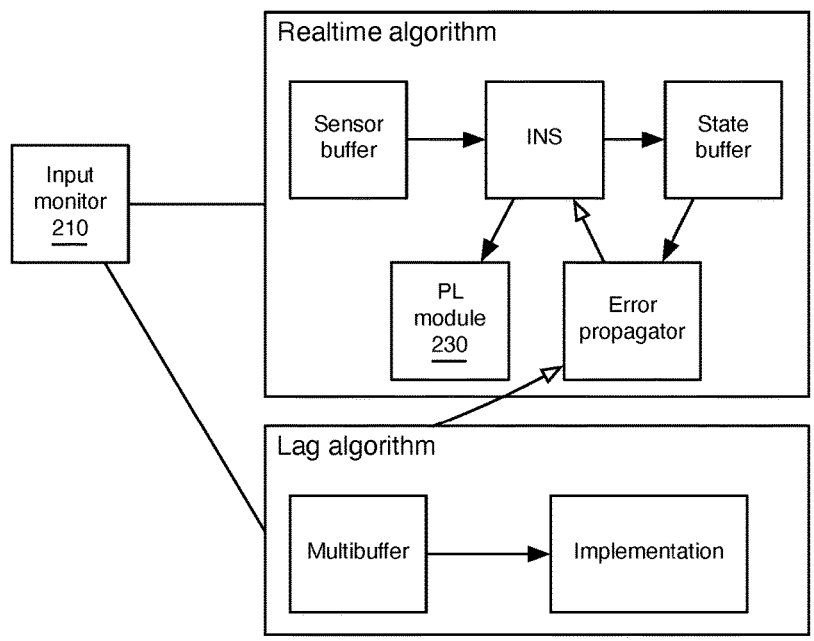
FIG. 4 is a schematic representation of an exemplary embodiment of the method that is implemented between a real time and a lagging algorithm.

The method and/or steps thereof can be performed in real- or near-real time (e.g., with sensor data acquisition, with GNSS observations, with external system operation, moving body motion, etc.), delayed, offline, and/or with any timing. In some embodiments (as shown for example in FIG. 4), the method can include real-time processes and lagging processes. In these embodiments real-time is generally, but not exclusively, defined with respect to the highest rate data source such that the positioning solution using the highest rate data source is computed before additional data is acquired. For example, when a system includes an IMU sensor and a GNSS receiver, the highest rate data source can be the IMU sensor. However, the GNSS receiver can be the highest rate data source (e.g., by down sampling IMU readings) and/or GNSS receiver and IMU sensor can have the same data rate. However, real-time can be otherwise defined.

Receiving sensor data S100 functions to receive data from one or more sensors. The sensor data is preferably received by a computing system (e.g., a positioning engine, fusion engine, etc. thereof), but can be received by any suitable component. The sensor data can be received from a sensor, a computing system (e.g., database, etc.), and/or from any suitable system. The sensor data is preferably received (e.g., acquired) at a sensor acquisition frequency. The sensor data is preferably associated with a timestamp. The timestamp is preferably the time the data was acquired but can be the time of receipt (e.g., by the computing system), the time of processing, and/or be any suitable time.

S100 can include correcting the sensor data which can function to apply an error correction (e.g., bias, scale factors, offset error, misalignment error, cross axis sensitivity, noise, environment sensitivity, coning, sculling, centrifugal acceleration effects, etc.) to the sensor data to remove or reduce the contribution of errors to the kinematic parameter solutions determined from the sensor data. The error correction can be determined based on sensor specification (e.g., calibrated biases), based on prior iterations of the method or a related method (e.g., an error determined for at an earlier time point, an error determined based on the GNSS observations or signals, etc.), modeled errors, an error determined from an independent data source (e.g., redundant sensor(s), redundant GNSS, map, etc.), and/or can otherwise be determined. For instance, errors determined by a lag algorithm can be used as the error correction in the real time algorithm (e.g., where each instance of the lag algorithm can be used to update the error corrections for the real-time algorithm).

Receiving one or more satellite observations S200 preferably functions to measure (e.g., at the receiver, at one or more reference stations, etc.) and/or access one or more sets of satellite observations (e.g., carrier phase measurements, pseudo-range measurements, code measurements, etc.) from one or more observed satellites. The satellite observations are preferably accessed or received by a computing system (e.g., a GNSS receiver computing system, positioning engine, fusion engine, etc.), but can be accessed by any component. The satellite observations (and/or corrections) can be measured by a GNSS receiver, retrieved from a database (e.g., retrieve stored satellite observations; retrieve stored corrections; retrieve an almanac; etc.), and/or be otherwise received. S200 can include receiving Doppler measurement data, reference data (e.g., from a reference station), and/or any suitable data. The satellite observations can include signals from one or more satellite constellations. Each set of satellite observations preferably includes satellite observations associated with a plurality of satellite constellations. However, one or more sets of satellite observations can correspond to a single satellite constellation.

The satellite observations received in S200 are preferably measured at a GNSS observation frequency. Generally, but not always, the GNSS observation frequency is less than the sensor acquisition frequency. The satellite observations are preferably associated with a satellite observation timestamp. The satellite observation timestamp is preferably the epoch associated with the satellite observations, but can additionally or alternatively be the time of receipt, time of processing, and/or any suitable time.

The satellite observations in S200 can be corrected (e.g., using corrections received or generated by a corrections service) and/or uncorrected. For instance, S200 can include receiving corrections (e.g., spatially variant corrections such as atmospheric corrections, ionospheric delay, ionospheric gradient, first order ionospheric effect, second order ionospheric effect, tropospheric delay, Hydrostatic component delay, Wet component delay, etc.; spatially invariant corrections such as satellite clock, satellite orbit, hardware bias, etc.; etc.) such as from a corrections service (e.g., as disclosed in U.S. patent application Ser. No. 17/347,874 filed 15 Jun. 2021 entitled "SYSTEMS AND METHODS FOR DISTRIBUTED DENSE NETWORK PROCESSING OF SATELLITE POSITIONING DATA" and/or U.S. patent application Ser. No. 17/554,397 filed 17 Dec. 2021 entitled "SYSTEM AND METHOD FOR GAUSSIAN PROCESS ENHANCED GNSS CORRECTIONS GENERATION," each of which is incorporated in its entirety by this reference). In variants, the corrections can include (e.g., be associated with) integrity information which can be accounted for in a protection level determination (e.g., as part of a TIR budget).

S100 and S200 can be performed concurrently, S100 can be performed before S200, S200 can be performed before S100, and/or S100 and S200 can be performed with any timing. Typically, but not always, S100 will be performed multiple times while S200 is being performed (e.g., several sets of sensor data each associated with a different timestamp will be acquired while a single set of satellite observations is acquired). S100 and S200 can be performed synchronously or asynchronously. The data acquired in S100 and S200 can be synchronized (e.g., aligned), up- or down-sampled (e.g., to a matching frequency), and/or can otherwise be related or not related.

Monitoring the data S300 functions to detect faults (e.g., whether a probability that any given datum has a greater than threshold probability of experiencing a fault) within the measured data (e.g., sensor data, satellite observations, reference station observations, corrections, etc.). S300 can be performed by a local computing system (e.g., GNSS receiver computing system, external system computing system, vehicle computing system, etc.), a remote computing system (e.g., a cloud computing system), and/or by any suitable system. S300 is preferably performed after S100 and/or S200, but can be performed concurrently with and/or before S100 and/or S200. Examples of faults or predetermined events that can be monitored for include: gaps in data (e.g., check if measurements are missing relative to an expected data readout frequency), jumps, accelerations, and/or other satellite, reference station, sensor, outliers, and/or other data source feared events.

S300 is preferably performed independently for each data source that is used to determine the position. For example, sensor data is preferably not monitored using GNSS data and vice versa. This can be beneficial for avoiding correlating and/or decreasing (e.g., minimizing) a correlation between inputs which can simplify the protection level determination (e.g., in S500). However, S300 can be performed using the same data sources (e.g., correlating the data monitors) that are used in the position determination (e.g., in step S400).

Typically, S300 is performed using data that has been received or acquired contemporaneously or concurrently. However, S300 can be performed using any suitable data (e.g., previously acquired data such as from a previous epoch or a previous instance of the method).

S300 is preferably performed in the measurement (e.g., observation) domain, but can be performed in a transformed domain (e.g., position, frequency, inverse position, time, velocity, acceleration, etc.) and/or in any suitable domain.

In an illustrative example, data associated with a primary sensor (e.g., a sensor that would likely be used to determine a position solution) can be monitored using data associated with a secondary sensor (e.g., a sensor that is not intended to be used for determining a positioning solution, a sensor that is dedicated to the monitoring task, etc.). Data readouts from the primary sensor can be compared to data readouts from the secondary sensor. When the data readouts agree (e.g., within a threshold amount, are within a predetermined number of standard deviations from one another, etc.), then the data (e.g., data associated with the primary sensor, data associated with the secondary sensor, etc.) can be passed to S400 and/or otherwise be used. When the data readouts do not agree (e.g., are outside a threshold agreement, differ by greater than a predetermined number of standard deviations, etc.), then data can be: flagged as potentially faulty, used (e.g., using the primary sensor data in S400 such as in the event the secondary sensor is presumed or determined to be faulty, using the secondary sensor data in S400 such as in the event the primary sensor is presumed or determined to be faulty, etc.), faults and/or potential faults can be mitigated (e.g., as described below), include secondary (or redundant) sensor data such as to maintain availability and/or continuity of operation in case a fault is detected and increases the integrity risk due to a potential wrong identification of a faulty primary sensor (e.g., because it can be challenging to detect posterior faults on the redundant sensor after rejection of the primary one), the method can be restarted, additional data can be acquired (e.g., S100 and/or S200 can be performed again), and/or any suitable response can occur.

In a second illustrative example, the set of satellites can be divided into a primary set of satellites and a monitoring set of satellites. Typically, the monitoring set of satellites will have fewer satellites than the primary set of satellites, but the two sets can have the same number and/or the monitoring set of satellites can include more satellites than the primary set of satellites. Each satellite constellation represented in the primary set is preferably, but does not have to be, represented in the monitoring set. Data associated with the primary set of satellites can be monitored using (e.g., compared to) data associated with the monitoring set of satellites. When the data from the two (or more) sets of satellites agree (e.g., within a threshold amount, are within a predetermined number of standard deviations from one another, etc.), then the data (e.g., satellite observations associated with the primary set of satellites, satellite observations associated with the monitoring set of satellites, etc.) can be passed to S400 and/or otherwise be used. When the data from the two (or more) sets of satellites do not agree (e.g., are outside a threshold agreement, differ by greater than a predetermined number of standard deviations, etc.), then data can be: flagged as potentially faulty, used (e.g., using the primary satellite observations in S400 such as in the event the monitoring set of satellites is presumed or determined to be faulty, using the monitoring set of satellite observations in S400 such as in the event the primary satellite observations are presumed or determined to be faulty, etc.), faults and/or potential faults can be mitigated (e.g., as described below), an integrity risk associated with using the data can be generated, the method can be restarted, additional data can be acquired (e.g., S100 and/or S200 can be performed again), and/or any suitable response can occur. In some variants, the events can be monitored or detected as disclosed in U.S. patent application Ser. No. 16/748,517 titled 'Systems and Methods For Reduced-Outlier Satellite Positioning' filed on 21 Jan. 2020 which is incorporated in its entirety by this reference.

In a third illustrative example, sensor data and satellite observations can be used to monitor each other. In variations of this example, care can be taken to ensure independence of the probability of predetermined events impacting the data monitoring ($P_{impact}$) and a probability of a missed detection ($P_{md}$), which can for instance enable $P_{md}$ and $P_{impact}$ to be multiplied when computing the integrity risk; to account for the probability of incorrect monitoring (e.g., false positives and/or false negatives in the data monitoring); and/or otherwise handle the data. This independence is typically, though not always, a product of the first and second illustrative examples. In the third specific example, the independence can be achieved by using a first subset of satellite observations to monitor sensor data and using a second set of satellite observations (e.g., preferably but not always with no overlap between the satellite observations in the first set) for determining the receiver position and/or integrity. However, independence can otherwise be achieved. In this illustrative example, the data can be compared in the position domain and/or in any suitable domain.

S300 can optionally include mitigating the effect of faults (predetermined events, probable or potential faults, etc.) in the data. Mitigating the effect of faults can include: removing data (e.g., sensor data, satellite observations, etc.) associated with the fault, scaling data (e.g., based on the fault), correcting the fault, flagging or otherwise identifying a data source as faulty (or exceeding a probability that a fault has occurred such as within a predetermined period of time), interpolating between data points, extrapolating from data points, acquiring additional data (e.g., restarting the method, performing another instance of S100 or S200, etc.), introducing additional (e.g., synthetic, measured, etc.) data (e.g., sensor data, satellite observations, etc. such as with a negative covariance), and/or any suitable mitigation step(s).

Determining the positioning solution S400 functions to determine (e.g., calculate, estimate, approximate, etc.) the position of the GNSS receiver and/or the external system. S400 can be performed by a local computing system (e.g., GNSS receiver computing system, external system computing system, vehicle computing system, etc.), a remote computing system (e.g., a cloud computing system), and/or by any suitable system. S300 is preferably performed after S100 and/or S200, but can be performed concurrently with and/or before S100 and/or S200. The receiver position is preferably determined using an estimator, but can be determined using any suitable module and/or algorithm. The estimator is preferably a Kalman filter (e.g., recursive Kalman filtering, extended Kalman filter, unscented Kalman filter, etc.), but can be or include a particle filter (e.g., Monte Carlo simulation), a least-squares solution (such as an iterative snapshot least-squares method), Gaussian process, and/or any suitable filter or algorithm.

The estimator preferably uses a loose coupling model (e.g., uncorrelated data such as sensor data and satellite observations are used to independently determine outputs such as receiver position, sensor error terms, etc. where the independent outputs can then be fused or combined). However, a tight coupling model (e.g., uncorrelated data such as sensor data and satellite observations are mathematically combined or used to cooperatively determine outputs such as receiver position), ultra-tight model (e.g., using a single filter to track all satellite observations), an independent model (e.g., independent outputs are not fused), and/or any suitable model can be used.

Inputs to the estimator can include the sensor data (e.g., monitored sensor data such as from S300, processed sensor data, sensor data received in S100, primary sensor data, secondary sensor data, etc.), satellite observations (e.g., monitored satellite observations such as from S300, processed satellite observations such as to account for a floating or integer valued carrier phase ambiguity, satellite observations received in S200, etc.), corrections data, reference station observations (e.g., satellite observations observed at a reference station, baseline, etc.), satellite data (e.g., orbital data), and/or any suitable inputs can be used. In a first variant, a floating carrier phase ambiguity can be determined and accounted for in the inputs. In a second variant, an integer carrier phase ambiguity can be determined (e.g., as disclosed in U.S. patent Ser. No. 11/035,961 filed 12 Mar. 2020 entitled "SYSTEMS AND METHODS FOR REAL TIME KINEMATIC SATELLITE POSITIONING" incorporated in its entirety by this reference) and accounted for in the inputs. In a third variant, a floating (or integer) carrier phase ambiguity can be determined by the estimator (where the carrier phase ambiguity can be used within the estimator to determine the outputs with or without outputting the carrier phase ambiguity). In a fourth variant, the integer nature of the carrier phase ambiguity can be leveraged, without explicitly fixing the carrier phase ambiguity to an integer value. However, any suitable satellite observations can be used as inputs.

Outputs (e.g., states) from the estimator can include: position solutions (e.g., receiver position, external system position, etc.), velocity solutions (e.g., receiver velocity, external system velocity, etc.), attitude (e.g., receiver attitude, external system attitude, etc.), acceleration (e.g., receiver acceleration, external system acceleration, etc.), solution covariances (e.g., a position, velocity, etc. covariance for one or more geometric direction x/y/z), carrier phase ambiguities (e.g., float carrier phase ambiguities, integer carrier phase ambiguities, etc.), and/or any suitable outputs. In a specific example, the outputs include a position in each of the x, y, and z coordinates and a covariance associated with each coordinate.

Typically, when using Kalman filters, measurement errors are assumed to be uncorrelated in time, which can lead to the Kalman filter anticipating improvements to the positioning solution resulting from smoothing. In these circumstances, the state error covariance can reflect the impact of this smoothing. By considering the correlated errors (e.g., state error covariance) as a state of the Kalman filter (e.g., state augmentation), the correlated errors can be estimated, and their predictions can be removed from observables which can enable uncorrelated measurement errors to be determined (e.g., in line with Kalman filter validity assumptions). However, considering the correlated components of the measurement errors as a state can additionally or alternatively impact the observability of the system and/or the stability of the filter. The GNSS position error and/or solution covariances are preferably modeled according to a Gauss Markov process (e.g., a first order Gauss Markov process, a second order Gauss Markov process, etc.), but can be determined according to any suitable process. A correlation time of the Gauss Markov process preferably depends on (e.g., is proportional to, is related to, is inversely proportional to, etc.) the velocity (e.g., current velocity, estimated velocity, previous velocity, etc.) of the GNSS receiver or external vehicle. The correlation time can additionally or alternatively depend on the receiver or external system position and/or otherwise depend on any suitable state, input, and/or property of the GNSS receiver or external vehicle. For instance, when the receiver or external system is traveling at a low speed the covariances are typically larger than when the receiver or external system is traveling at a higher speed (e.g., relative to the low speed). This can occur because the correlation (e.g., correlation distance) of the GNSS error (e.g., multipath error) is smaller at larger speeds (e.g., the higher the distance per time unit, the lower the time for a given correlation distance). Accounting for this effect can be beneficial because without accounting for the dependence of the covariances on speed, the filter can filter out errors as uncorrelated in time (while is not the actual case), typically resulting in an optimistic (e.g., too small) error covariance. However, the correlation time can be independent of the velocity, constant, and/or otherwise be determined. However, the outputs do not have to include the covariances.

In a specific example, a fusion engine can be used to determine (e.g., model, estimate, predict, etc.) the positioning solution. The fusion engine can include a filter (e.g., a Kalman filter, extended Kalman filter, unscented Kalman filter, etc.), an error model (e.g., to identify which sensor errors to estimate, how to estimate the sensor errors, etc.), a time synchronizer (e.g., a buffer, which can function to temporally align data streams with different latency), a GNSS positioning engine (e.g., which can function to resolve a carrier phase ambiguity, determine kinematic parameters from the GNSS data, a filter, etc.), and/or any suitable components. The sensor engine can function to determine a kinematic parameter of the moving body based on the sensor data. The sensor engine can include a mechanization model (e.g., built on a physical dynamic model that gets discretized, a set of equations or relationships to determine kinematic parameters from sensor data), an integrator (e.g., a numerical integration model for applying the mechanization model to determine current kinematic parameters from a previous kinematic parameter, to propagate previous kinematic parameters to a current time, etc.), an error compensator (e.g., which can correct sensor measurements for error estimates), a filter (e.g., a Kalman filter, extended Kalman filter, unscented Kalman filter, etc.), and/or any suitable components. The sensor engine can determine a moving body PVA solution (e.g., a position, velocity, attitude, etc.) by integrating the (corrected) sensor data stream. The sensor PVA solution and the GNSS data can be provided to the fusion engine which can synchronize the GNSS data with the sensor data and/or the PVA solution, determine a PVA solution using the GNSS data, and estimate sensor error(s) based on the PVA solution from the sensor engine and the PVA solution from the GNSS data. The estimated sensor error can be provided to the sensor engine (e.g., error compensator). In some variations, the sensor data and the GNSS data can be provided to the fusion engine (e.g., without determining intermediate PVA solutions).

Determining the protection levels S500 functions to determine (e.g., calculate, estimate, approximate, etc.) the protection levels of the position solution, where the protection levels can be used, for example, to evaluate a safety of using the positioning solution for external system operation. The protection level preferably refers to a bound on the positioning solution error where the probability for the positioning solution error to exceed the protection level is less than an integrity risk (e.g., a probability of losing integrity such as operating with misleading information or hazardously misleading information, probability that the position error exceeds an alert limit, etc.). The protection level can include and/or be associated with a horizontal protection level, a vertical protection level, an along-track protection level (e.g., a protection level in a direction parallel to a motion vector of the GNSS receiver, sensor, external system, etc.), a cross track protection level (e.g., a protection level in a direction orthogonal to a motion vector of the GNSS receiver, sensor, external system, etc.), horizontal velocity protection level, vertical velocity protection level, along-track velocity protection level, cross-track velocity protection level, roll protection level, pitch protection level, yaw protection level, and/or any suitable protection level.

S500 is preferably performed after S400, but can be performed at the same time as S400. S500 can be performed by a local computing system (e.g., GNSS receiver computing system, external system computing system, vehicle computing system, positioning engine, fusion engine, etc.), a remote computing system (e.g., a cloud computing system), and/or by any suitable system. Each direction can be associated with a protection level (e.g., a protection level in x, y, and z coordinates), protection levels can be determined for horizontal and/or vertical directions (e.g., in a cylindrical coordinate system), for angular directions (e.g., roll, yaw, pitch), and/or protection levels can be determined for any suitable conditions. In specific example, the protection level can be sub-centimeter, cm, dm, m, dam, greater than dam, have a value therebetween, and/or have any suitable scale or value. The determined protection level is preferably greater than the actual protection level (e.g., which can be beneficial for ensuring that the system is not operating based on misleading or hazardously misleading information), but can be equal to and/or less than the actual protection level. The determined protection level is preferably a close to (e.g., a tight bound on) the actual protection level (e.g., within about 0.1%, 0.5%, 1%, 5%, 10%, 20%, values or ranges therebetween, etc. of the actual protection level). However, the determined protection level can be a poor estimate of the actual protection level (e.g., differ by greater than 20% such as when a poor protection level is acceptable, when insufficient information is available, etc.).

The protection levels can be determined based (and/or depend on) on the outputs or states of the estimator (as shown for example in FIG. 3), the inputs to the estimator, the data sources (e.g., data source identity, probability of a fault or other predetermined event impacting the data source, an allocated integrity risk associated with the data source, etc.), a correlation between data sources (e.g., based on a coupling of data sources), an application of the external system, an alert limit, a target protection level, a set of fault modes (e.g., a list of faults or fault modes, a plurality of faults, one or more faults, one or more potential faults, monitored conditions, etc.), a target integrity risk, and/or based on any suitable parameter(s). The target integrity risk can be a total integrity risk (e.g., a total budgeted integrity risk), an integrity risk excluding one or more fault modes (e.g., excluding an integrity risk budgeted for unmonitored fault modes, unmodeled fault modes, etc. such as target integrity risk=total integrity risk−integrity risk allocated to unmodeled fault modes), and/or can be any suitable target integrity risk.

The protection level determination can account for every fault mode of the set of fault mode, can account for a subset of the fault modes (e.g., by adjusting or changing an integrity risk or total integrity risk, by adjusting the target integrity to implicitly account for one or more unmodeled faults, account for fault modes that can occur in a given situation, etc.), can account for a nominal case (e.g., when no faults are considered to occur such as by reducing a target integrity risk to account for an estimated integrity risk for potentially operating in a faulty condition), and/or otherwise account for any suitable situation(s).

Figure 8:
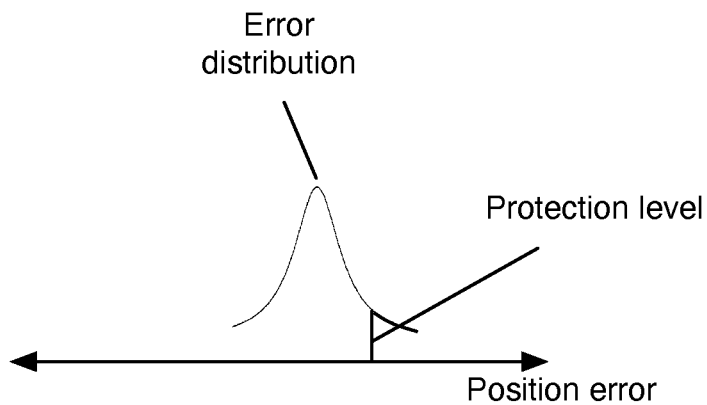
FIG. 8 is a schematic representation of an example of an impact of a fault mode as a function of position error.

Each fault mode of the set of fault modes is preferably associated with a fault model (e.g., a model accounting for an impact of the fault on the integrity, a probability of a fault occurring, a probability that a fault occurs and is not detected, an allocated integrity risk, a distribution of error, a fault magnitude, etc.). The impact of a fault can depend on the GNSS receiver environment (e.g., whether GNSS signals are available or not), a fault magnitude (e.g., a larger fault magnitude can result in a larger impact of the fault), the protection level, the user dynamics, and/or can otherwise depend on the fault and/or other parameters. For example, an impact can refer to an average impact (e.g., averaged over a range of fault magnitudes), an instantaneous impact (e.g., for a given fault magnitude, a range of magnitudes can map to a given impact, etc.), and/or can refer to any suitable impact. Similarly, a probability of a fault occurring, a fault magnitude, a probability of missing detection of a fault (e.g., a probability that a fault occurs and is not detected), and/or any suitable information can be environment dependent (e.g., urban vs open sky environment, temperature, weather, etc.), can be environment independent, can be fault magnitude dependent (e.g., larger magnitude faults can be easier to detect), and/or can depend on any suitable information and/or conditions. In a specific example, the impact (e.g., a probability) can be calculated dynamically (e.g., iteratively) with the PL (e.g., to set the PL to a level where the impact is below a threshold value). The fault magnitude can be dependent on the fault type (e.g., the event type), the sensor that is impacted, and/or other factors. The magnitude can be in the sensor's units (e.g., meters for pseudoranges, m/s$^2$ for accelerometers, °/s for gyroscopes, etc.), and/or in other units. However, subsets of fault modes can use the same fault model (e.g., fault modes associated with a shared class such as type of fault, type of data source, etc.), a single fault model can be used for a set of fault modes (e.g., each combination of fault modes can have a fault model), and/or any suitable fault model(s) can be used. The fault model can be a look-up table (as shown for example of FIG. 7), an equation, a relationship (as shown for example in FIG. 8), machine learning model, and/or any suitable model can be used. The fault model can be determined based on historical data, by simulating a component (e.g., using historic data, data with faults introduced, synthetic data, etc.), using artificial intelligence, based on a component specification (e.g., a certification, previously measured values, etc.), based on an operation condition of the GNSS receiver and/or sensor (e.g., open sky conditions, urban conditions, obstructions, etc.), and/or can be determined in any manner. As a specific example, a probability of missed detection can be determined by simulating an input monitor (e.g., fault monitor) detecting faults on historic data and/or test data (e.g., historic or synthetic data with one or more faults injected). As another specific example, a probability of a fault occurring can be determined from historic data and/or from operation data. As another illustrative example, a fault impact can be determined from simulations of a positioning engine and/or fusion engine using data with a fault injected into the data. However, the fault model (and/or components thereof) can be determined in any manner. In illustrative examples, the sensor bias abnormal instability can have an impact that is dependent on whether the user is in a GNSS denied environment (e.g., large impact; close to 1) or in non-GNSS denied environment (e.g., lower impact; lower than than 1, etc.; wherein GNSS partially corrects for the error at each kalman filter update, etc.); satellite maneuvers can have an impact of 1 if non-detected (e.g., since they can lead to large range residual increases on the order of 100ths of meters); clipping problem impacts can depend on whether the user is operating in GNSS-denied environment or not, and/or depend on the user dynamic; cycle slip impacts can be on the order of 0.1; undetected receiver hardware faults can have an impact of 1; and satellite hardware faults can have an impact of 1 for large-magnitude faults and 0.1 for lower-magnitude faults. However, the impacts for each of the above can have other values, and/or be determined in any suitable manner.

During protection level determination, the set of fault modes can be static (e.g., for a predetermined amount of time, for an instance of the method, for a given processor, etc.) and/or dynamic (e.g., can be updated). The set of fault modes can be updated at a predetermined frequency, at predetermined times, responsive to data sources (e.g., new satellites coming into view, satellites leaving line of sight of the GNSS receiver, change in sensor availability, change in reference station in view of the GNSS receiver, change in baseline, etc.), randomly (e.g., to test an impact of fault(s) in the protection level estimate), and/or in response to any suitable input and/or with any suitable timing. In an illustrative example, when a GNSS receiver becomes obstructed (e.g., stops receiving satellite signals), the set of fault modes can be updated. In a first variant, one or more fault modes from the set of fault modes can be removed (e.g., satellite fault modes can be removed from the set of fault modes, GNSS receiver fault modes can be removed from the set of fault modes, etc.). In a second variant, one or more fault models can be updated. For instance, fault model(s) (e.g., an impact, probability of occurrence, etc.) associated with a satellite and/or GNSS receiver can be set to 0.

Examples of fault modes (e.g., events, predetermined events, etc.) that can be considered or accounted for include: satellite effects or satellite faults (e.g., data corruption; code carrier incoherency; satellite clock faults such as step, drift, acceleration, etc. faults; satellite orbit faults; satellite hardware bias; satellite maneuver(s) such as unscheduled satellite maneuvers; antenna pattern sudden change such as antenna pattern changing; evil waveform such as distortion at a payload that generates a synchronization error at a receiver depending on its chip spacing or design; satellite constellation faults; etc.), GNSS receiver events or GNSS receiver faults (e.g., non-line of sight faults; multipath errors such as pseudorange error greater than about 10 cm, 20 cm, 50 cm, 1 m, 2 m, 5 m, 10 m, 20 m, 50 m, etc.; interference errors; cycle slips; receiver clock offset jumps; receiver hardware bias; evil waveform such as distortion at a payload that generates a synchronization error at a receiver depending on its chip spacing or design; etc.), sensor events or sensor faults (e.g., sensor bias instabilities; step changes such as scale factor step changes; clipping problems, such as when an IMU output is no longer linearly related with the motion; update failures such as a data source reading that does not change particularly when it is expected to; accelerometer error; gyroscope error; magnetometer error; coning; sculling; centrifugal acceleration effects; noise; cross axis sensitivity; misalignment errors; change in alignment; environment sensitivity such as to temperature, humidity, thermal gradients, accelerations, pressure, etc.; etc.), corrections faults (e.g., faulty corrections, obsolete corrections, etc.), reference station events or reference station faults (e.g., interference errors; cycle slips; receiver clock offset jumps; receiver hardware bias; etc.), datalink faults or errors (e.g., signal jamming, signal spoofing, etc.), monitored faults (e.g., fault modes that a fault monitor and/or input monitor checks for), unmonitored faults (e.g., fault modes that a fault monitor and/or input monitor does not check for), and/or any suitable fault modes can be considered. In an illustrative example (as shown for instance in FIG. 7), a list of monitored faults can include a satellite outage, sensor bias instability, multipath, satellite maneuvers, antenna pattern change, clipping problems, cycle slips, receiver hardware faults, and satellite hardware faults. However, the set (e.g., list) of faults can include any suitable fault modes. In variants, a fault mode can include a plurality of fault modes (e.g., a plurality of simultaneous faults such as for two or more of the faults above occurring simultaneously, for two or more data sources simultaneously having a fault, etc.).

The protection level is preferably determined using a numerical method (e.g., a golden section search, Fibonacci search, Newton's method, secant method, line search methods, etc.), but can additionally or alternatively be determined using artificial intelligence (e.g., a neural network), a series expansion, an analytic solution, and/or using any suitable method(s).

The protection level is preferably determined iteratively, but can be determined in a single pass, recursively, and/or in any manner. The number of iterations can depend on the data latency (e.g., a time until a next epoch, a time until additional data is recorded, etc.), a number of data sources, a number of faults to consider, the types of faults, a target integrity risk, a target protection level, a resolution of the protection level, an alert level (e.g., set by or determined based on the application), a time to alert, a processor bandwidth, a velocity of the GNSS receiver or external system, and/or be a constant, random or pseudorandom, be performed until a change in the protection level predicted between iterations is less than a threshold, and/or otherwise depend on any suitable properties. For example, more iterations can be used to achieve cm resolution than to achieve dm resolution. However, the number of iterations can otherwise be determined.

Figure 9:
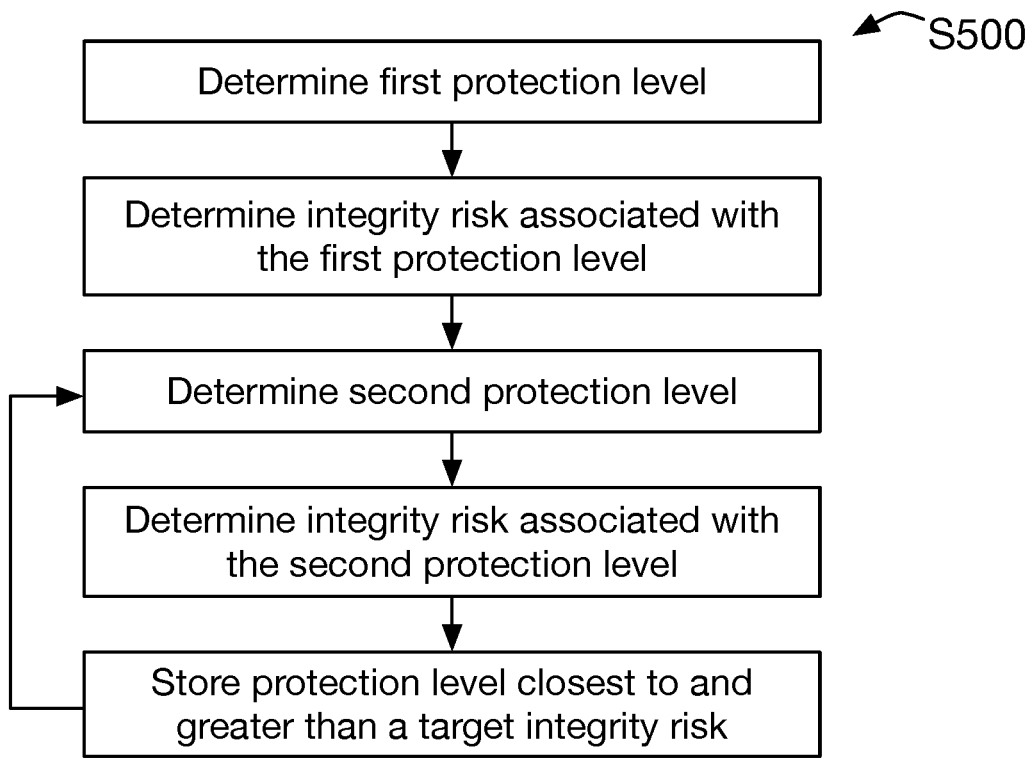
FIG. 9 is a schematic representation of an example of determining a protection level iteratively.

In an illustrative example (as shown for instance in FIG. 9), the protection level can be determined iteratively by computing an integrity risk associated with a first protection level, determining a second protection level, computing a second integrity risk associated with the second protection level, storing the protection level of the first and second protection level that is closest to without exceeding the target integrity risk, and repeating the steps for additional protection level values.

In a specific example, the protection levels can be determined according to:

$$TIR = P(f(x-\hat{x}) > PL) = P(f(x-\hat{x}) > PL | H_0) P(H_0) + \Sigma_{i=0} P(f(x-\hat{x}) > PL | H_i) P(H_i)$$

Where TIR is the target integrity risk (e.g. the probability that a function $f$ of the difference between the actual x and estimated state vector $\hat{x}$ exceeds the reported protection level), $P(f(x-\hat{x}) > PL | H_0)$ is the probability of exceeding a certain error (e.g., the reported protection level) in the nominal case $H_o$ (e.g., in the situation where no fault has occurred or no fault is likely to have occurred), $P(H_0)$ is the probability of being in the nominal case, $P(f(x-\hat{x}) > PL | H_i)$ is probability of exceeding a certain error (e.g., the reported protection level) in the fault case $H_i$, $P(H_i)$ is the probability of being in said fault case (e.g., the probability of fault case i occurring). The summation preferably includes all possible fault modes (e.g., single faults, multiple faults, satellite faults, sensor faults, receiver faults, etc.), but can include a subset of faults (e.g., a subset of faults with a threshold impact, a subset of faults with a threshold probability of occurring, faults associated with a subset of data sources, etc.). The target integrity risk can be determined based on an application of the positioning solution (e.g., the external system application), manually selected (e.g., determined by an operator of the external system or GNSS receiver), be constant (e.g., less than or equal to $10^{-2}$/hour, $10^{-3}$/hour, $10^{-4}$/hour, $10^{-5}$/hour, $10^{-6}$/hour, $10^{-7}$/hour, $10^{-8}$/hour, $10^{-9}$/hour, $10^{-10}$/hour, etc.; greater than $10^{-2}$/hour; etc.), and/or have any suitable value. The probability of exceeding the protection level (e.g., an impact of) in each case (e.g., nominal case, fault cases) can be a constant value (e.g., set to 1), determined heuristically, determined empirically, determined based on historical data, and/or can otherwise be determined. The probability of being in each case (e.g., nominal case, fault cases) can be a constant value (e.g., based on a manufacturer specification, based on an operator specification, a known constant, etc. such as $10^{-1}$/hour, $10^{-2}$/hour, $10^{-3}$/hour, $10^{-4}$/hour, $10^{-5}$/hour, $10^{-6}$/hour, $10^{-7}$/hour, values therebetween, etc.), determined heuristically, determined empirically, determined based on historical data, and/or can otherwise be determined. In this specific example, iterations can be performed to determine the protection level that meets that target integrity risk. The function, $f(x-\hat{x})$, can be a polynomial function (e.g., linear, quadratic, cubic, etc.), an exponential function, a logarithmic function, and/or any suitable function.

In variations of this specific example, determining the covariance as a state of the estimator can be beneficial for calculating (e.g., accurately calculating) the value of $f(x-\hat{x})$.

In a second specific example, the protection level can be computed based on the nominal case only such as according to $TIR = P(f(x-\hat{x}) > PL) = P(f(x-\hat{x}) > PL|H_0)P(H_0)$.

In a third specific example, the protection level can be computed according to:

$$IR = \sum_{i=0}^{N} P(f(x-\hat{x}) > PL \mid H_i) P(H_i) P_{md}(H_i),$$

IR is a target integrity risk, N is a number of events in the list of events, $P(f(x-\hat{x}) > PL|H_i)$ is the impact of event i (e.g., where each event can be labelled with an event number, where event i=0 can be the nominal or faultless event, etc.), PL is the protection level, $P(H_i)$ is the probability of event i occurring, and $P_{md}(H_i)$ is the probability of not detecting event i. In variants of the third specific example, the equation can be solved iteratively (e.g., by changing PL during each iteration and reevaluating IR). In variants of this specific example, IR can be compared to a target integrity risk, where the determined protection level can be the protection level associated with an IR closest to and/or greater than the TIR.

However, the protection level can otherwise be computed.

In some variations, S500 can include inflating or deflating the determined protection levels. As an illustrative example, the determined protection levels can be multiplied by a multiplier. The modifier can be predetermined, determined based on the set of fault modes, determined based on the input sources, and/or can otherwise be determined. Different components of the protection level can be inflated by the same or different amounts. For instance, a horizontal and vertical protection level can be modified by the same or different modifiers. Similarly, a position and velocity protection level can be modified by the same or different modifiers. The modifiers are preferably linear modifiers (e.g., multipliers such as 1.1×, 1.5×, 2×, 5×, etc.), but can be nonlinear modifiers (e.g., nonlinear functions) and/or any suitable modifier can be used.

In some embodiments, particularly but not exclusively when the protection level and/or position is determined using float carrier phase ambiguities, S500 can include fusing, combining, seeding, and/or otherwise using the protection level and/or position solution to facilitate and/or determine a protection level and/or position using integer carrier phase ambiguities (e.g., using a previously determined protection level to bootstrap or improve a determination of a carrier phase ambiguity, positioning solution, filter convergence, etc.).

Operating the external system S600 functions to operate the external system based on the position solution (e.g., coordinates, location, etc.). S600 can be performed by a local computing system (e.g., GNSS receiver computing system, external system computing system, vehicle computing system, etc.), a remote computing system (e.g., a cloud computing system), and/or by any suitable system. S600 is preferably performed after S500, but can be performed concurrently with and/or before S500 (e.g., after S400). S600 is preferably performed autonomously or semi-autonomously, but can be performed manually (e.g., by an operator, by a controller such as for remotely controlled external systems, etc.) and/or otherwise be performed.

S600 is preferably performed (e.g., particularly but not exclusively autonomously) when a protection level meets an external system operation condition. However, S600 can be performed when the protection level does not achieve the external system operation condition (e.g., including a flag or warning indicative of the external system operation condition not being achieved, for a predetermined amount of time, etc.). The external system operation condition(s) are typically determined based on the external system and/or application thereof (e.g., tighter thresholds may be needed for a terrestrial vehicle compared to an aerial vehicle, because different fault cases can arise for different vehicles or applications, etc.). Examples of the external system operation conditions include: alert limits (e.g., a threshold protection level in one or more dimension), time to alert (e.g., an amount of time that the protection level exceeds or can exceed a threshold value; an absolute time such as 10 ms, 100 ms, 1 s, 2 s, 5 s, 10 s, etc., 1 epoch, 2 epochs, 5 epochs, 10 epochs, etc.), a protection level resolution, a time to determine the protection level, an amount of time since a protection level was last computed, a probability of an undetected or unmonitored fault occurring, and/or any suitable conditions can be used. When the external system operation condition is not met, the method can be restarted (e.g., from S100, from S200, from S300, from S400, from S500, etc.), the protection level can be recalculated (e.g., by performing S500, accounting for additional fault modes, for additional iterations, with new initial conditions, etc.), the position can be recalculated (e.g., by performing S400), the position can be used (e.g., including a flag or warning indicating that the condition was not met), the external vehicle can switch from autonomous to manual (e.g., operator) control, and/or any suitable response can occur.

S600 can include transforming the GNSS receiver position to the external system position. For example, the GNSS receiver position can be transformed to the external system position based on a baseline, mounting, transformation, and/or other knowledge or information about the GNSS receiver relative to or within the external system (e.g., a relative pose of the GNSS antenna and the center of mass or other reference of the external system).

In specific variants including reference stations, the baseline vector b, corresponding to the position of the receiver or external system relative to a reference station, can be determined. The baseline vector can be determined, for instance, based on the carrier phase ambiguity. However, the baseline vector can be determined in any suitable manner. In these variants, the position of the receiver (e.g., relative to the reference station(s), absolute position) can be determined by applying b to the (known) reference station location. However, S600 can determine (e.g., calculate) the receiver position in any suitable manner.

S600 can include generating instructions for operation of the external system based on the external system position. For example, operation instructions for a vehicle can include making lane adjustments to remain within a lane of traffic, turning instructions, increase or decrease speed, and/or other instructions for traversing a path, obeying laws, and/or other purposes.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
    receiving a set of satellite observations associated with a plurality of satellites;
    monitoring the set of satellite observations for one or more potential satellite faults;
    receiving at least one of acceleration data, angular velocity data, or magnetic field data associated with an IMU sensor;
    monitoring the at least one of acceleration data, the angular velocity data, or the magnetic field data for one or more potential IMU sensor faults;
    determining a position estimate and associated positioning error for the rover based on the set of satellite observations and the at least one of the acceleration data, the angular velocity data, or the magnetic field data;
    determining a protection level associated with the position estimate based on a set of potential faults, an impact of each fault of the set of faults, a probability of each fault of the set of faults occurring, and a probability of not detecting each fault of the set of faults, wherein the determined protection level exceeds a true protection level by at most 10%; and
    providing an alert when the positioning error exceeds the protection level.

2. The method of claim 1, wherein the set of potential faults comprise multipath events, interference errors, cycle slips, data corruption, code carrier incoherency, satellite clock faults, satellite clock drift, unscheduled satellite maneuvers, jump drift, antenna pattern changing, non-line of sight faults, receiver clock offset jumps, evil waveform, or combinations thereof.

3. The method of claim 2, wherein the set of potential faults further comprise sensor bias instabilities, scale factor errors, clipping problems, update failures, accelerometer error, gyroscope error, signal jamming, signal spoofing, misalignment errors, cross axis errors, thermal gradient errors, acceleration errors, coning errors, sculling errors, centrifugal acceleration effects, or combinations thereof.

4. The method of claim 1, wherein determining the position estimate comprises determining a GNSS positioning estimate based on the set of satellite observations and an IMU positioning estimate based on the at least one of acceleration data, angular velocity data, or magnetometer data; wherein the GNSS positioning estimate and the IMU positioning estimate are blended to determine the position estimate.

5. The method of claim 4, wherein determining a GNSS positioning estimate comprises:
    determining a set of carrier phase ambiguity hypothesis for each satellite observation of the set of satellite observations; and
    selecting a carrier phase ambiguity of the set of carrier phase ambiguity hypotheses based on results of a hypothesis test comparing carrier phase ambiguities of the set of integer phase ambiguity hypotheses;
    wherein the GNSS positioning estimate is determined using satellite observations associated with selected carrier phase ambiguities.

6. The method of claim 4, wherein the position estimate and the position error are determined using a Gauss Markov process.

7. The method of claim 6, wherein the position error is correlated in time, wherein a correlation time of the Gauss Markov process depends on a velocity of the rover.

8. The method of claim 1, wherein the set of potential faults comprises potential satellite faults and potential IMU sensor faults.

9. The method of claim 1, wherein the protection level is determined using a numerical method.

10. A system for determining a kinematic solution of a rover comprising:
    an input monitor configured to receive and monitor at least one of satellite observations or sensor data for an event;
    a fusion engine configured to determine the kinematic solution of the rover based on the at least one or satellite observations or sensor data; and
    an integrity module configured to determine a protection level of the kinematic solution based on a list of events to evaluate and an event model for each event of the list of events, wherein the list of events comprises satellite events and sensor events, wherein the satellite events comprise multipath events, interference errors, cycle slips, data corruption, code carrier incoherency, satellite clock faults, satellite clock drift, unscheduled satellite maneuvers, jump drift, antenna pattern changing, non-line of sight faults, receiver clock offset jumps, evil waveform, or combinations thereof; and wherein the sensor events comprise sensor bias instabilities, scale factor step changes, clipping problems, update failures, accelerometer error, gyroscope error, signal jamming, signal spoofing, or combinations thereof, and wherein the event model for each event comprises:
a probability of not detecting the respective event:
a probability of the respective event occurring; and
an impact of the respective event on the protection level.

11. The system of claim 10, wherein the list of events depends on an application of the rover.

12. The system of claim 10, wherein during a loss of communication with a lost communication satellite, the probability of the respective event for a satellite event of the satellite events associated with the lost communication satellite is changed to 0.

13. The system of claim 10, wherein the integrity module iteratively determines the protection level based on the list of events and the event model.

14. The system of claim 13, wherein the integrity module determines the protection level by iteratively solving $$TIR = \sum_{i=0}^{N} P(E > PL \mid H_i)P(H_i)P_{md}(H_i),$$

where TIR is a target integrity risk, N is a number of events in the list of events, $P(E>PL|H_i)$ is the impact of event i, PL is the protection level, $P(H_i)$ is the probability of event i occurring, $P_{md}(H_i)$ is the probability of not detecting event i.

15. The system of claim 14, wherein during each iteration solving $$TIR = \sum_{i=0}^{N} P(E > PL \mid H_i)P(H_i)P_{md}(H_i)$$

comprises solving $$TIR = \sum_{i=0}^{N} P(E > PL \mid H_i)P(H_i)P_{md}(H_i)$$

with a different test protection level.

16. The system of claim 14, wherein the target integrity risk comprises a total integrity risk and an integrity risk for not monitored events.

17. The system of claim 10, wherein the sensor data comprises at least one of accelerometer data, gyroscope data, or magnetometer data.

18. A method comprising:
receiving a set of satellite observations associated with a plurality of satellites;
monitoring the set of satellite observations for one or more potential satellite faults;
receiving at least one of acceleration data, angular velocity data, or magnetic field data associated with an IMU sensor;
monitoring the at least one of acceleration data, the angular velocity data, or the magnetic field data for one or more potential IMU sensor faults;
determining a position estimate and associated positioning error for the rover based on the set of satellite observations and the at least one of the acceleration data, the angular velocity data, or the magnetic field data;
determining a protection level associated with the position estimate based on a set of potential faults, an impact of each fault of the set of faults, a probability of each fault of the set of faults occurring, and a probability of not detecting each fault of the set of faults, wherein the set of potential faults comprise multipath events, interference errors, cycle slips, data corruption, code carrier incoherency, satellite clock faults, satellite clock drift, unscheduled satellite maneuvers, jump drift, antenna pattern changing, non-line of sight faults, receiver clock offset jumps, evil waveform, or combinations thereof; and
providing an alert when the positioning error exceeds the protection level.

19. The method of claim 18, wherein the set of potential faults further comprise sensor bias instabilities, scale factor errors, clipping problems, update failures, accelerometer error, gyroscope error, signal jamming, signal spoofing, misalignment errors, cross axis errors, thermal gradient errors, acceleration errors, coning errors, sculling errors, centrifugal acceleration effects, or combinations thereof.

20. The method of claim 18, wherein determining the position estimate comprises determining a GNSS positioning estimate based on the set of satellite observations and an IMU positioning estimate based on the at least one of acceleration data, angular velocity data, or magnetometer data; wherein the GNSS positioning estimate and the IMU positioning estimate are blended to determine the position estimate.

21. The method of claim 20, wherein determining a GNSS positioning estimate comprises:
determining a set of carrier phase ambiguity hypothesis for each satellite observation of the set of satellite observations; and
selecting a carrier phase ambiguity of the set of carrier phase ambiguity hypotheses based on results of a hypothesis test comparing carrier phase ambiguities of the set of integer phase ambiguity hypotheses;
wherein the GNSS positioning estimate is determined using satellite observations associated with selected carrier phase ambiguities.

22. The method of claim 18, wherein the position estimate and the position error are determined using a Gauss Markov process.

23. The method of claim 22, wherein the position error is correlated in time, wherein a correlation time of the Gauss Markov process depends on a velocity of the rover.

* * * * *